United States Patent [19]

Telder

[11] Patent Number: 5,781,019
[45] Date of Patent: Jul. 14, 1998

[54] PROBE FOR USE IN TIME DOMAIN REFLECTOMETRY

[76] Inventor: Bert Jan Telder, 2517-78 St., Edmonton, Alberta, Canada, T6K 3W5

[21] Appl. No.: 694,663

[22] Filed: Aug. 9, 1996

[51] Int. Cl.$^6$ .................................................. G01R 27/04
[52] U.S. Cl. ........................ 324/643; 324/632; 324/644; 73/304 C; 73/304 R
[58] Field of Search ....................... 73/304 R, 304 C; 324/632, 642, 643, 644

[56] References Cited

U.S. PATENT DOCUMENTS

| | | | |
|---|---|---|---|
| 4,991,915 | 2/1991 | Thompson | 324/640 |
| 5,059,914 | 10/1991 | Lacombe | 324/642 |
| 5,554,936 | 9/1996 | Mohr | 324/642 |

*Primary Examiner*—Ernest F. Karlsen
*Assistant Examiner*—Jose M. Solis
*Attorney, Agent, or Firm*—Anthony R. Lambert

[57] ABSTRACT

A probe for use in time domain reflectometry includes a body having a conductive portion and an insulated portion. A conductive loop is provided having a first end and a second end. The first end is secured in the insulated portion of the body. The second end is secured in the conductive portion of the body, thereby shorting and grounding the conductive loop. An RF connector is provided for coupling the first end of the conductive loop to time domain reflectometry instrumentation.

5 Claims, 4 Drawing Sheets

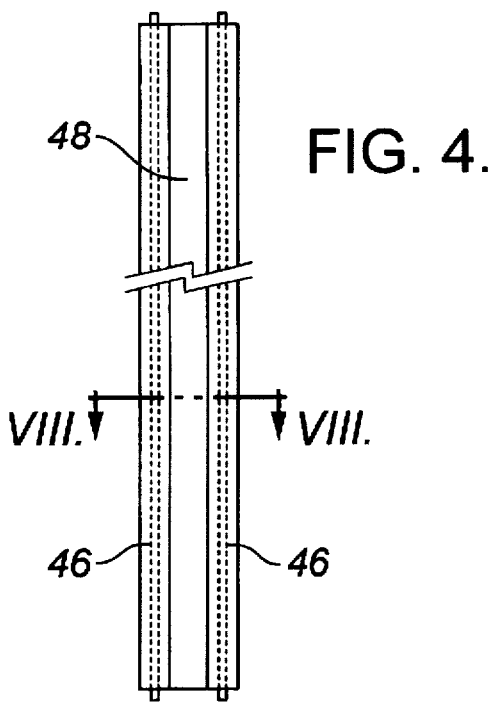
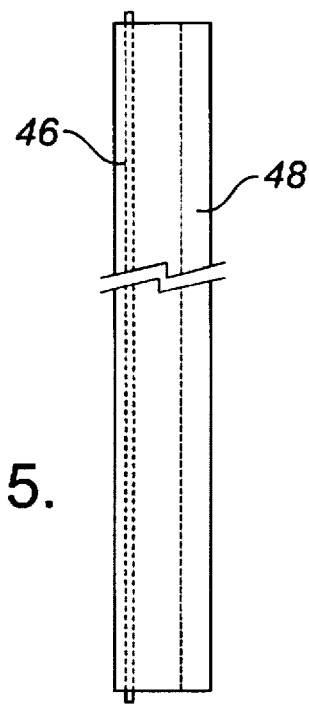
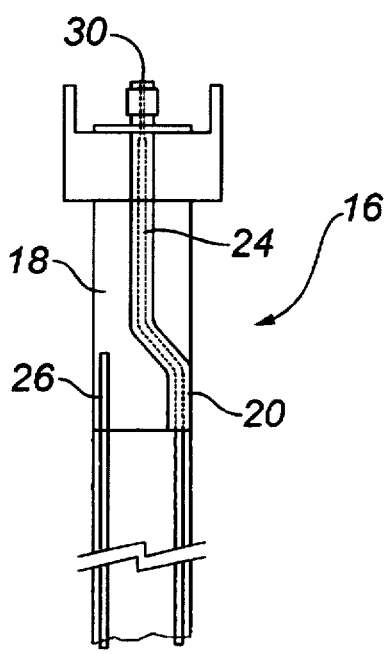
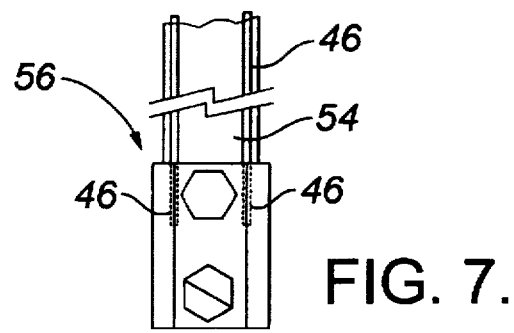
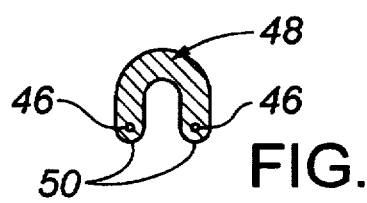

PROBE FOR USE IN TIME DOMAIN REFLECTOMETRY

FIELD OF THE INVENTION

The present invention relates to a probe for use in time domain reflectometry and, in particular, a probe for sensing the level of a liquid or a granular solid.

BACKGROUND OF THE INVENTION

Time domain reflectometry (TDR) involves propagating pulses along the length of a probe structure which constitutes a low quality transmission line. When used in a level sensing application, the probe is generally immersed in a liquid or a granular solid. Impedance changes occur at all interfaces formed between materials of different dielectric constant. The time difference between an induced reference reflection and the interface surface enables the measurement of material level and characteristic properties.

Time domain reflectometry (TDR) systems provide accurate indications of liquid level and respond quickly to changes in the levels, but they require complex and expensive systems to function properly. The use of MIR means for generating the transmit pulses and converting the received return signal provides an accurate and inexpensive approach to implementing TDR. This system is described in U.S. Pat. No. 5,345,471 to McEwan and utilizes inexpensive integrated circuits to perform the TDR operation. An example of the application of TDR to level measurement is described in U.S. Pat. No. 3,832,900 to Ross and utilizes an open coaxial transmission line that is immersed in, and filled by the contained liquid. The liquid surface creates a discontinuity in the coaxial transmission line that produces a reflection of the baseband pulse signal that propagates back along the transmission line. The time at which this reflection is received, relative to the time of the transmitted pulse, determines the liquid level. However, this transmission line is prone to clogging.

A major limitation in the application of TDR to level sensing relates to the design of the component, called the probe, doing the actual sensing while in contact with the fluid. When a highly viscous fluid like hot asphalt is being sampled a residual coating may remain on a probe leaving conventional capacitance sensors unable to discriminate whether this coating is a real fluid. U.S. Pat. No. 3,995,212 which issued to Ross teaches one method of correcting the problems associated with probes using TDR for level sensing. The Ross reference proposes a single wire sensor that is not subject to clogging. TDR sensing is not adversely affected by this residual coating if the structure of the probe is sufficiently exposed, as is the case with the single wire type taught by Ross. However, this type of probe has other inherent drawbacks. The probe of Ross and, in general, probes associated with radio frequency circuitry are not grounded to the vessel wall and thus are capable of storing a static charge which presents the risk of accidental ignition of vapours and gases. In addition, for long lengths of probe, as would be required in tall oil storage tanks, the single wire TDR approach will suffer from signal degradation as a function of length and requires amplification. For lengths approaching 40 feet, the single wire approach would have a very small return signal when reflected from near the bottom, especially if fabricated from stainless steel or similar lower conductivity metals as may be required in corrosive fluids. Also, when considering longer lengths, it will be necessary to anchor the probe to the container by means that does not affect accuracy or reliability and in so doing a substantial tensile load may exist on the probe when the container changes dimension as may be induced by load changes or thermal effects on volume. For most sensors this anchor would limit the functionality of a probe since it would potentially ground the end or some other part. The measurement of fluids in transport containers requires that means be provided to support the probe and prevent damage from vibration or fluid movement without affecting the function of the probe. A mechanical means is required to transfer the radio frequency signal or pulse through a transmission line from a source outside the container to the probe inside matching the impedance of the transmission line while maintaining a pressure seal. In explosive atmospheres elaborate means are employed to prevent ignition of gas mixtures and most Electronic type of gauges represent some risk if they fail.

There is, therefore, a great and still unsatisfied need for a new fluid level probe which addresses the forgoing concerns associated with conventional devices, and which provides adequate solutions thereto.

SUMMARY OF THE INVENTION

What is required is a probe for use in time domain reflectometry.

According to one aspect of the present invention there is provided a probe for use in time domain reflectometry which includes a body having a conductive portion and an insulated portion. A conductive loop is provided having a first end and a second end. The first end is secured in the insulated portion of the body. The second end is secured in the conductive portion of the body, thereby shorting and grounding the conductive loop. Means is provided for coupling the first end of the conductive loop to time domain reflectometry instrumentation.

The probe, as described above, can be made in two alternative embodiments. In a first embodiment, the conductive loop is rigid. In the second embodiment, the conductive loop is made from a flexible steel wire. In order to avoid the disadvantages experienced in the prior art, however, the steel wire is supported within a polymer plastic frame. It is preferred that the polymer plastic frame be in the form of a generally "U" shaped channel having two parallel axially extending arms in which the steel wire is imbedded.

According to another aspect of the present invention there is provided a flexible probe in combination with a liquid container. The liquid container has a liquid receiving interior cavity with a top and a bottom. The probe includes an upper body having a conductive portion and an insulated portion. The upper body is secured to the top of the liquid receiving cavity of the liquid container. A conductive wire loop depends from the body. The conductive loop has a first end and a second end. The first end is secured in the insulated portion of the body. The second end is secured in the conductive portion of the body, thereby shorting and grounding the loop. The conductive wire loop is supported within a generally "U" shaped polymer plastic frame having two parallel axially extending arms in which the conductive wire loop is imbedded. The polymer plastic frame has an upper end and a lower end. A lower body is secured to the bottom of the liquid receiving interior cavity of the liquid container. The lower body is secured to the lower end of the polymer plastic frame. Means is provided for coupling the first end of the conductive wire loop to time domain reflectometry instrumentation.

BRIEF DESCRIPTION OF THE DRAWINGS

These and other features of the invention will become more apparent from the following description in which reference is made to the appended drawings, wherein:

FIG. 4 is a front elevation view of the probe illustrated in FIG. 3.

FIG. 5 is a side elevation view of the probe illustrated in FIG. 3.

FIG. 6 is a detailed side elevation view of an upper fitting for the probe illustrated in FIG. 3.

FIG. 7 is a detailed side elevation view of a lower shorting block for the probe illustrated in FIG. 3.

FIG. 8 is a top plan view in section of the probe illustrated in FIG. 3, taken along section lines A—A of FIG. 4.

DETAILED DESCRIPTION OF THE PREFERRED EMBODIMENT

Figure 1:
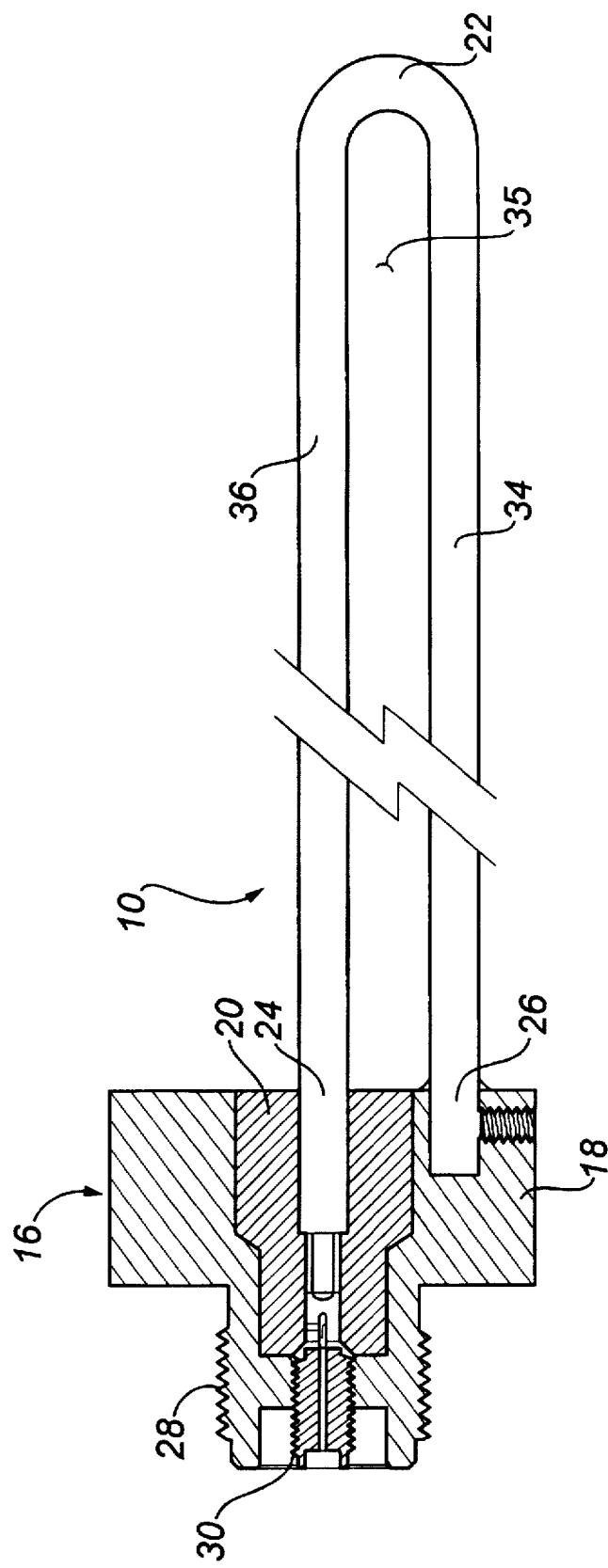
FIG. 1 is a side elevation view, in section, of a first embodiment of a probe for use in time domain reflectometry constructed in accordance with the teachings of the present invention.
Figure 2:
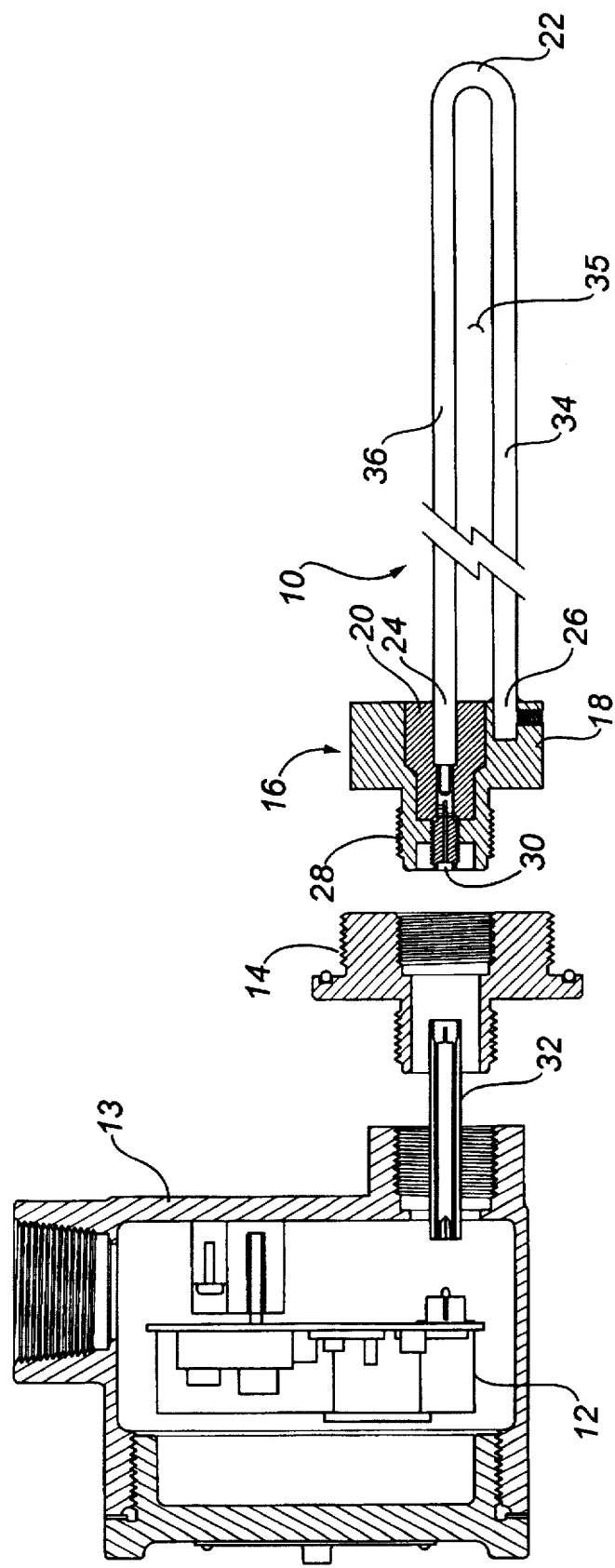
FIG. 2 is an exploded side elevation view, in section, of the probe illustrated in FIG. 1, attached to associated instrumentation.

A probe for use in time domain reflectometry generally identified by reference numeral 10, will now be described. A first preferred embodiment of probe 10 is illustrated in FIGS. 1 and 2. A second preferred embodiment of probe 10 is illustrated in FIGS. 3 through 8.

Referring to FIG. 2, a TDR electronics module 12 is positioned within a housing 13. TDR electronics module 12 is coupled to probe 10 through an RF coupling device 14. RF coupling device 14 is also a pressurized fitting accommodated in housing 13. Referring to FIG. 1, probe 10 includes a body, generally identified by reference numeral 16. Body 16 has a steel conductive portion 18 that surrounds a teflon insulated portion 20. A conductive loop 22 is provided having a first end 24 and a second end 26. First end 24 extends into insulated portion 20 of body 16. Second end 26 extends into conductive portion 18 of body 16, thereby shorting and grounding conductive loop 22. Body 12 has a threaded portion 28 which is used to couple probe 10 with RF coupling device 14, as illustrated in FIG. 2. An RF connector 30 is provided for coupling first end 24 of conductive loop 22 to time domain reflectometry instrumentation in electronics module 12. Electronics module 12 has an RF extension line 32, that extends through RF coupling device 14 to mate with RF connector 30 of probe 10. In this first embodiment, conductive loop 22 is fabricated of steel rod or similar material. This allows conductive loop 22 to be self supporting and robust. For the purpose of this description, conductive loop 22 can be considered to include two integrally attached rods; a grounded rod 34 and a center rod 36. Grounded rod 34 provides mechanical support for center rod 36. It is center rod 36 which conducts pulse signals generated by electronics module 12. Grounded rod 34 being anchored to body 12, transfers the majority of any applied tensile load to RF coupling device 14 and to housing 13 for TDR electronics module 12. Grounded rod 34 is spaced at a distance from center rod 36 so that a constant impedance, in the preferred case 200 ohms, is maintained along the length of the probe. This spacing between grounded rod 34 and center rod 36 is identified by reference numeral 35. The presence of grounded rod 34 produces a continuous uniform ground reflection surface along the length of center rod 36 which ensures a low loss for propagation of the pulses along the length. The parallel line is very simple in structure (excluding the end conditions) and can be approximated by the following formula;

$$Z_o = (120/\sqrt{\epsilon_r}) \ln 2D/d$$

where, $$d/D \ll 1$$

An open wire structure, such as that disclosed in FIGS. 1 and 2, would normally be considered to be an inferior type of transmission line when viewed as a means for efficiently conveying a signal from one point to another. Because it is open it will tend to radiate. Also, because there is nothing to protect the region between the two wires from effects of the environment in which the transmission line structure resides the impedance of the structure is strongly affected by the dielectric constant of the surrounding medium. The present invention converts these drawbacks into desirable features. The operation of probe 10 will now be discussed with respect to electric field density, characteristic impedance, and wave speed. In a parallel line structure the electric field lines propagate radially outwardly from the conductor surface, namely grounded rod 34 and center rod 36. In an ideal scenario all electric fields emanating from one of rods 34 or 36, would eventually terminate at the surface of the other of rods 34 or 36. The greatest concentration of electric field lines occurs in the region of space 35 between grounded rod 34 and center rod 36. Outside of this region the field lines exist, but their density decreases with distance. Electric field density changes in proportion to any change in the dielectric constant. Conductive loop 22 has its greatest sensitivity to changes in dielectric constant in space 35 that lies between rods 34 and 36, and between them. The characteristic impedance of a transmission line is also related to the dielectric constant of the region of space 35 between the conductors, ie. grounded rod 34 and center rod 36. When a change in the dielectric constant occurs, as from air to liquid, there is a change in the characteristic impedance this creates an impedance mismatch. The presence of an impedance mismatch causes a reflection of incident energy to occur when an electromagnetic wave front "pulse" passes through the region of the mismatch. The reflected energy pulse travels back to the source of the incident pulse. The reflected energy is proportional to the degree of mismatch between the two regions. The polarity of the reflection is related to the polarity of the mismatch. The time of flight of the reflected pulse with respect to the incident is proportional to the distance from the source along the transmission line where the mismatch occurred. The dielectric constant of both the initial and subsequent media have an effect on the wave speed of the pulse. The propagation of a wave along the transmission line structure provided by loop 22 will be at a speed that is determined by the inverse of the square root of the magnetic permeability times the dielectric constant. Any change in the dielectric constant will alter the speed at which the wave propagates. These changes in electric field density, characteristic impedance and wave speed are measurable and proportional to the dielectric constant.

Unlike conventional radio frequency type of sensors, such as used in capacitance or admittance devices, the relatively closely coupled electric fields limit influences of external sources to the near field region of the transmission line. This means that abberations inside tanks such as piping have little or no effect on the functionality of the probe.

Second end 26 of probe 10 is terminated in a short circuit to dissipate static charge that can build up on conductive loop 22 when measuring liquids. Because a pulse is being transmitted by electronics module 12 the effect of the short is only detected when the pulse is reflected from the short and returned to the sampling circuitry and the time of flight is determined. This probe would not be usable with a continuous wave signal because of the shorted line.

Probe 10, as described above, is mostly independent of related circuit elements and temperature variations and can be inexpensively manufactured. Typical installation locations are inside containers and vessels near walls or suspended from top plates and lids or through nozzles and mounted to flanges. The probe may be mounted through a sidewall fitting and bent at a right angle vertically up or down from the fitting location.

Once the underlying principle of probe 10 is understood, there are a wide variety of variations that may be developed. Probe 10 can be formed from a rigid rod or tubing material or can be made from a flexible open cable or special form of twinlead cable with exposed central path region. The probe may also be constructed from flat metal stock to form a grounded parallel plate structure or from angle metal stock to form an 'x' shaped structure. The open unrestricted design of the probe allows for detection of highly viscous liquids and sludges, as may be encountered in crude oil tanks, without risk of clogging or false level indication. Typically the probe can be constructed in known lengths of single rod folded to create a shorted parallel line of predetermined length. It is also possible to construct the probe from a pair of long rods that are connected at the base by a shorting bar or block which can also perform the task of anchoring the probe and excess length of rod may be trimmed off. Thus probes of any desired length may be constructed and trimmed in situ. For automotive, recreational vehicle or similar fields the probe can be constructed as a nozzle or fill tube extension that is put in-line with the inflow piping for retrofit of existing storage containers. The basic probe structure can be cast or embedded by extrusion in plastic, for example polyethylene, for a low cost single piece design. As in the case of Micro Impulse Radar, the required signal delay line can also be part of the embedded structure.

Figure 3:
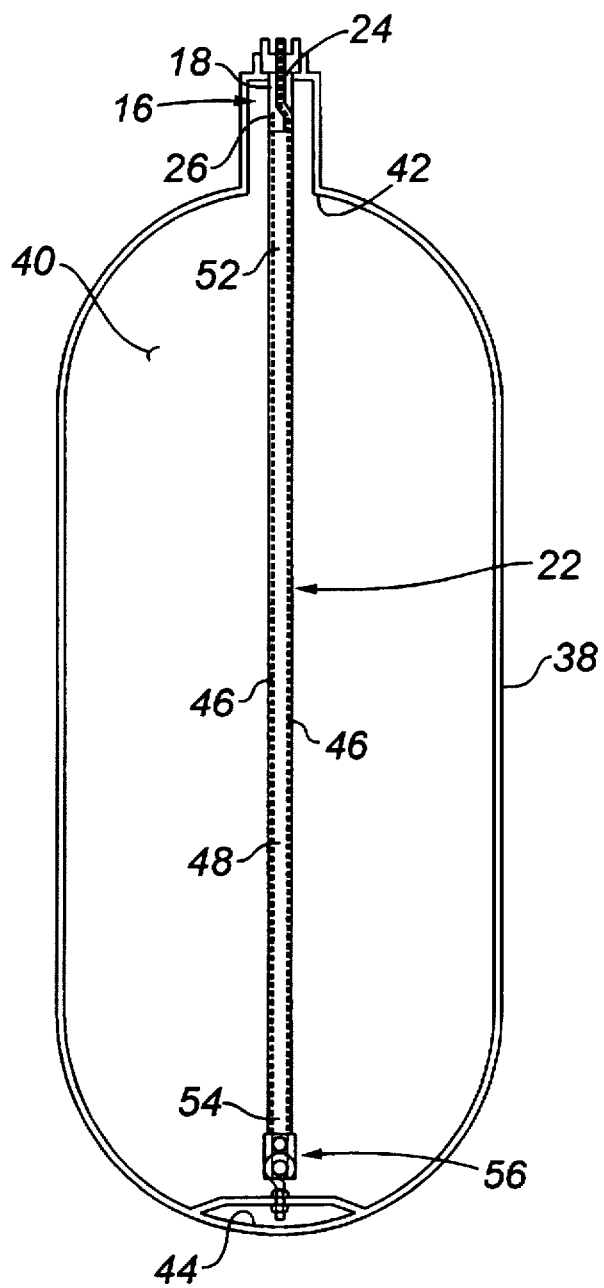
FIG. 3 is a side elevation view, in section, of a second embodiment of a probe for use in time domain reflectometry, the probe being positioned within a tank.

Referring to FIGS. 3 through 8, there is illustrated a second embodiment of probe 10. In this second embodiment similar components to those in the first embodiment will be assigned the same reference numerals. Referring to FIG. 3, there is illustrated a liquid container or tank 38 made of metal having a liquid receiving interior cavity 40 with a top 42 and a bottom 44. Second embodiment of probe 10 has an upper body 16 having a conductive portion 18 and an insulated portion 20. Upper body 16 is secured to top 42 of liquid receiving interior cavity 40 of liquid container 38. As with the first embodiment, conductive loop 22 depends from upper body 16. Conductive loop 22 has a first end 24 and a second end 26. Referring to FIG. 6, first end 24 is secured in insulated portion 20 of upper body 16. Second end 26 is secured in conductive portion 18 of upper body 16, thereby shorting and grounding conductive loop 22. Here, however, the configuration of conductive loop 22 differs from that described in the first embodiment. Referring to FIGS. 4 and 5, instead of a rigid steel, conductive loop 22 is constructed of thin conductive wire 46. Steel wire is supported within polymer plastic frame 48. Referring to FIG. 8, it can be seen that polymer plastic frame 48 is generally "U" shaped having two parallel axially extending arms 50 in which conductive wire 46 is imbedded. Referring to FIG. 3, polymer plastic frame 48 has an upper end 52 and a lower end 54. A lower body 56 is secured to bottom 44 of liquid receiving interior cavity 40 of liquid container 38. Referring to FIG. 7, lower body 56 attaches to lower end 54 of polymer plastic frame 48 and engages conductive wire 46. It is preferred that lower body 56 be made of a conductive material and coupled with conductive loop 22 in such a manner as to short and ground conductive loop 22. Referring to FIG. 6, a RF connector 30 is provided in upper body 16 for coupling first end 24 of conductive loop 22 to time domain reflectometry instrumentation.

Modifications to the preferred embodiment will now be discussed. The illustrated embodiment shows a pair of circular rods or tubes. One can just as readily use parallel metal plates or strips. In order to maintain the sensitivity of the parallel line structure it is preferred that the width of the plates or strips be significantly greater than the spacing between them. The illustrated embodiment has center rod 36 "floating" in its connection to connector 30 and supported by grounded rod 34. If desired, the structure can be reconfigured to provide for tensile loading capacity of center rod 36, while maintaining the impedance profile of the illustrated embodiment.

It will be apparent to one skilled in the art that the new probe, as described above is suitable for use in other applications that used TDR. In particular, the teachings relating to the new probe are capable of being used as part of a linear displacement transducer in machine tools, hydraulic actuators and similar devices with movable parts. It will also be apparent to one skilled in the art that this probe can be used for sensing translational motion of objects or fluids in near proximity. It will finally be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. In combination:

a liquid container having a liquid receiving interior cavity with a top and a bottom;

a probe for use in time domain reflectometry, comprising:
  an upper body having a conductive portion and an insulated portion, the upper body being secured to the top of the liquid receiving interior cavity of the liquid container;
  a lower body secured to the bottom of the liquid receiving interior cavity of the liquid container;
  flexible conductive wire placed in tension between the upper body and the lower body to form a conductive loop having a first end and a second end, the first end being secured in the insulated portion of the upper body, the second end being secured in the conductive portion of the upper body, thereby shorting and grounding the conductive loop; and
  means for coupling the first end of the conductive loop to time domain reflectometry instrumentation.

2. In combination:

a liquid container having a liquid receiving interior cavity with a top and a bottom;

a probe for use in time domain reflectometry, comprising:
  an upper body, a lower body, and a flexible conductive wire placed in tension between the upper body and the lower body;
  the upper body having a conductive portion and an insulated portion, the upper body being secured to the top of the liquid receiving interior cavity of the liquid container;
  the flexible conductive wire forming a conductive wire loop depending from the upper body, the conductive loop having a first end and a second end, the first end being secured in the insulated portion of the upper body, the second end being secured in the conductive portion of the upper body, thereby shorting and grounding the loop, the conductive wire loop being supported within a generally "U" shaped polymer plastic frame having two parallel axially extending arms in which the conductive wire loop is imbedded, the polymer plastic frame having an upper end and a lower end;

the lower body being secured to the bottom of the liquid receiving interior cavity of the liquid container, the lower body being secured to the lower end of the polymer plastic frame; and means for coupling the first end of the conductive wire loop to time domain reflectometry instrumentation.

3. The combination as defined in claim 1, wherein the conductive loop has the conductive wire supported within a polymer plastic frame.

4. The combination as defined in claim 3, wherein the polymer plastic frame is a generally "U" shaped channel having two parallel axially extending arms in which the conductive wire is imbedded.

5. The combination as defined in claim 2, wherein the lower body is made of a conductive material and is coupled with the conductive wire loop, thereby shorting and grounding the conductive wire loop.

* * * * *